(12) United States Patent
Tipton et al.

(10) Patent No.: US 6,669,839 B2
(45) Date of Patent: Dec. 30, 2003

(54) WASTEWATER PRETREATMENT, GATHERING AND FINAL TREATMENT PROCESS

(76) Inventors: Gary A. Tipton, 14910 Welcome La., Houston, TX (US) 77014; Guy L. Harrell, 14910 Welcome La., Houston, TX (US) 77014

( * ) Notice: Subject to any disclaimer, the term of this patent is extended or adjusted under 35 U.S.C. 154(b) by 0 days.

(21) Appl. No.: 10/268,483

(22) Filed: Oct. 10, 2002

(65) Prior Publication Data

US 2003/0066804 A1 Apr. 10, 2003

Related U.S. Application Data

(60) Provisional application No. 60/328,231, filed on Oct. 10, 2001.

(51) Int. Cl.⁷ .......................... B01D 17/12; B01D 36/00
(52) U.S. Cl. .................. 210/85; 210/96.1; 210/134; 210/151; 210/170; 210/202; 210/258; 210/920; 210/921
(58) Field of Search ................ 210/96.1, 97, 143, 210/151, 180, 182, 170, 199, 201, 202, 257.1, 258, 259, 605, 614, 620, 631, 747, 774, 919, 920, 921, 532.2, 749, 806, 85, 86, 103, 104, 134, 198.1

(56) References Cited

U.S. PATENT DOCUMENTS

| | | | | |
|---|---|---|---|---|
| 3,875,051 A | * | 4/1975 | Kovarik | 210/170 |
| 4,618,421 A | * | 10/1986 | Kantor | 210/170 |
| 5,725,762 A | * | 3/1998 | Beal et al. | 210/181 |
| 5,792,342 A | * | 8/1998 | Heller et al. | 210/921 |
| 5,895,569 A | * | 4/1999 | Connelly | 210/170 |
| 6,139,744 A | * | 10/2000 | Spears et al. | 210/614 |
| 6,284,138 B1 | * | 9/2001 | Mast | 210/920 |
| 6,562,236 B2 | * | 5/2003 | Rylander et al. | 210/920 |

\* cited by examiner

Primary Examiner—Joseph Drodge
(74) Attorney, Agent, or Firm—Keeling Hudson, L.L.C.; Kenneth A. Keeling; James E. Hudson, III

(57) ABSTRACT

A process and system for pretreating, gathering, transmitting and finally treating waste produced at multiple locations includes pretreating the waste proximate the generation site, gathering the pretreated waste and transmitting the waste to a final treatment facility. One or more gathering stations, with sensing and feedback mechanisms, allow for controlled injection of waste to collection lines, and segments thereof, to control system demand through the collection line and to final treatment facility. The pretreating step includes removing particulates that impede the flow of waste through the collection lines.

9 Claims, 2 Drawing Sheets

US 6,669,839 B2

WASTEWATER PRETREATMENT, GATHERING AND FINAL TREATMENT PROCESS

CROSS-REFERENCE TO RELATED APPLICATIONS

This application claims the benefit of U.S. Provisional Application No. 60/328,231, filed Oct. 10, 2001.

STATEMENT REGARDING FEDERALLY SPONSORED RESEARCH OR DEVELOPMENT

Not Applicable.

BACKGROUND OF THE INVENTION

1. Field of Invention

The present invention relates to waste treatment systems, and particularly to a process for the treatment of waste from multiple locations.

2. Related Art

In urban areas residential, commercial or industrial wastes are typically treated by municipal wastewater treatment facilities. In rural areas, individual systems for treating wastewater include septic tanks, mound systems, holding tanks, and aerobic systems. Such individual systems have varying degrees of effectiveness.

In these systems, the waste or wastewater is a mixture of water and contaminants. The terms waste, wastewater, wastewater streams and other similar variations are used to denote this high water-content material at various levels of contamination, by various forms of contaminants.

In areas where access to a municipal wastewater treatment plant is not available, but the population is large enough to install a final treatment plant, the standard practice is to build a gathering system along with a small treatment plant. The collection systems in general take two forms—gravity and pressure systems.

A gravity system relies on gravity to move the sewage water to the final treatment plant. To accommodate the sludge associated with sewage waters, the piping must be large enough to prevent clogging and must generally maintain a gradient, often requiring deep line burial. Lift stations are required at selected intervals to maintain a gradient sufficient to move the wastewater and sludge to the final treatment plant. This method is costly to install and the lift stations require continuous monitoring and maintenance.

In areas where there is a large variation in topography or other conditions preclude deep trenching, a pressure system is employed. In a pressure system, the sewage water and sludge is pumped from waste-generating locations into a main feed line that is connected to the final treatment plant. This main line may follow the topography, so that deep burial of the line is not required. Since the system is pressurized, a smaller line may be used than with a gravity system line. To reduce the potential for clogging, grinder pumps or other mechanisms are used to reduce the size of solids in the wastewater prior to inserting the waste into the gathering system. Pressure systems are generally less costly to install than gravity systems since smaller pipes can be used and trenching is not as deep. However, the grinder pumps, which are essentially small lift stations, are more numerous. The grinder pumps require regular maintenance and expense.

A disadvantage of prior art conventional treatment plants is that such treatment plants have a narrow range of loading rates within which they can provide efficient processing of wastes. Such plants are relatively expensive to expand due to space and equipment requirements.

Individual treatment plants may be placed at each waste-generating location together with a mechanism to disperse the treated wastewater. Septic systems utilize a drainfield to complete the treatment process and to disperse the water into the soil. Septic systems are being phased out in most states due to failures of the systems. Septic systems often allow dispersal of untreated wastewater into the water table, creating a health hazard.

To reduce the potential of groundwater contamination, mound systems, which are a variation of septic systems, have been installed. A mound system creates an artificial separation between the drainfield and the watertable allowing time for the wastewater to be treated in the soil prior to reaching groundwater. These systems are costly, unsightly and require a large area to maintain property setbacks and to insure proper treatment and infiltration.

Aerobic treatment systems allow treatment at the waste-generating site. Aerobic systems treat wastewater in a tank supplied with an air source. Discharge of the effluent from aerobic systems may be accomplished by different methods. Due to the potential for pathogens, viruses and other microorganisms remaining in the wastewater, the wastewater may be disinfected for above ground release or injected below ground to prevent human contact. Disinfection methods include chemicals, ozone, ultraviolet radiation, and combinations thereof. The potential for health hazards varies depending on the system, regular monitoring of the systems and proper maintenance of the systems. Such systems can be relatively costly. Discharge of system effluent presents another problem for the owner. In times of high use, the amount of system effluent may exceed the need for water in the aboveground application.

Below ground injection is safer, but can be more costly to install and requires space to adequately infiltrate the wastewater. Many sites do not have the space to support below ground injection. System failures can create health hazards, produce annoying odors and result in costly repairs.

Accordingly, it is a goal of the present invention to provide a wastewater treatment system and process wherein:

The system allows for individual treatment systems, but reduces the space requirement normally associated with individual systems by collecting the discharge to a final treatment location for final treatment.

The collection piping can be downsized to facilitate installation, since no solids can enter the piping system and no biomass buildup can occur.

The final treatment plant can be down sized to specialize in disinfection of the wastewater, with filtration added, if required.

Grinder pumps are not required, thus reducing the cost and maintenance required with most pressure systems.

The final treatment plant can be upgraded to meet new connection requirements easily with little additional space, as disinfection requires a smaller facility footprint and can handle a wider range in volumes of incoming wastewater than a conventional plant.

Initial costs are reduced since the final treatment plant is not required to be sized to meet final projected growth as the disinfection system can be readily expanded.

The low cost of the collection system allows economical initial installation of collection lines with allowance for future expansion requirements.

The system allows a plurality of pump chambers along the collection network, which allows timed dosing to the collection system. The pump chambers can then be used to average flow fluctuations, resulting in a downsized collection system. Pump chambers may be employed at either or both of each generation site or at various stages of the collection system.

The individual pump chambers will require fewer lift stations in the collection system, since each can function as a lift station, and since the pretreated flow is primarily liquid.

There are individual treatment systems, but the system provides a final treatment discharge point for the treated effluent. This allows a single point of monitoring for all systems.

BRIEF SUMMARY OF THE INVENTION

The present invention provides a system and process for treating wastewater generated at multiple locations. The system involves a plurality of pretreatment units, a plurality of gathering stations, a plurality of pumps, at least one collection line and a final treatment station. The process involves preliminary treatment, or pretreatment, of the wastewater at or near the wastewater generating site, gathering the pretreated wastewater from the various waste-generating sites, transporting the pretreated wastewater to a final treatment location and providing final treatment of the wastewater to produce effluent discharge that conforms to regulatory, environmental or sound practice standards, or alternatively, to provide discharge suitable for reuse within applicable regulatory, environmental or sound practice limits.

DESCRIPTION OF THE INVENTION

Figure 1:
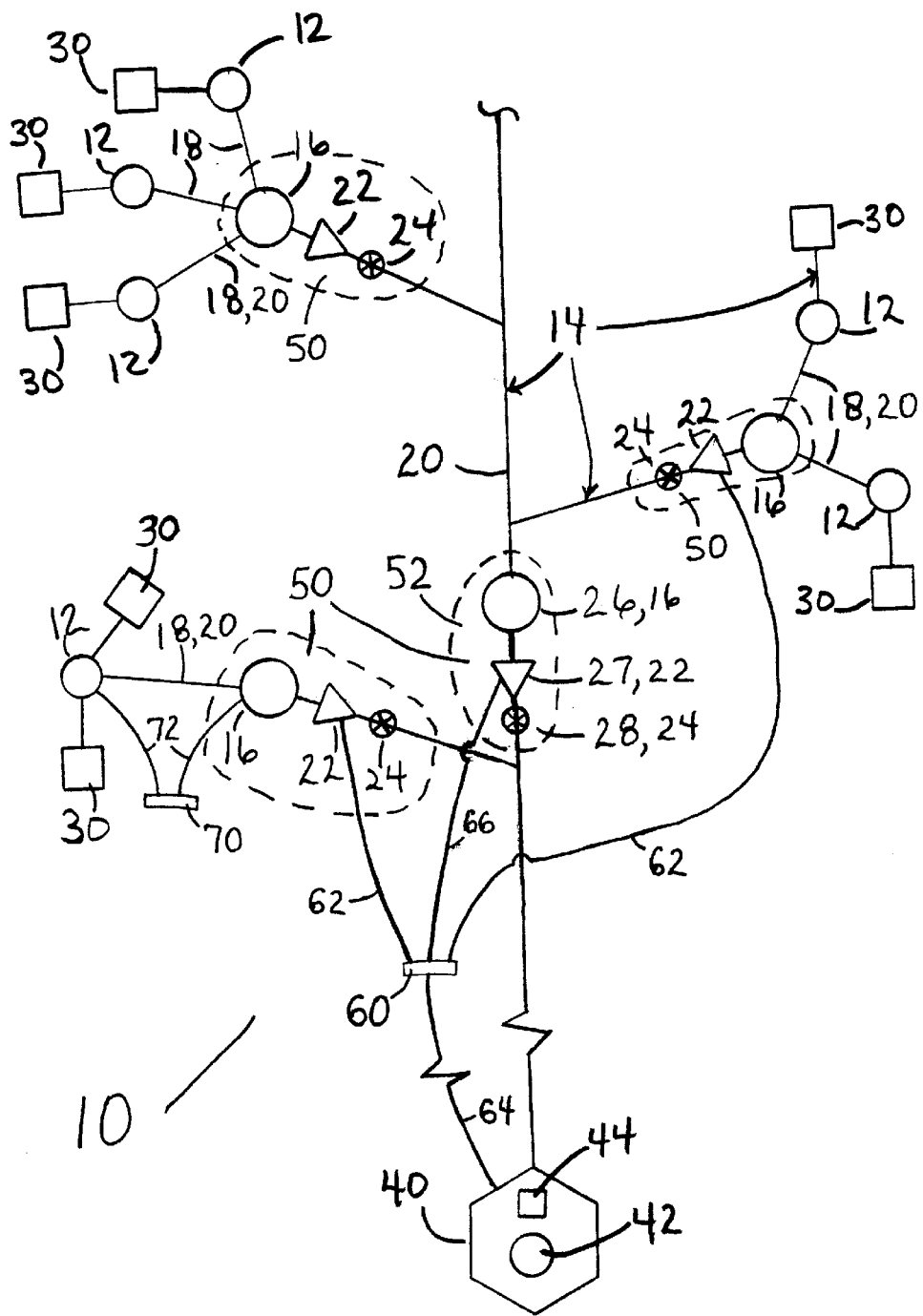
FIG. 1 provides a schematic diagram of an exemplary system of the present invention.

Referring to FIG. 1, a schematic diagram of the system of the present invention is depicted.

The system 10 includes a plurality of pretreatment units 12 to provide initial treatment at waste-generating sites 30. Waste-generating sites 30 may be residences, commercial locations or industrial facilities. Pretreatment units 12 are located physically near waste-generating sites 30 and accept the entirety of the waste, waste stream or wastewater stream, which terms are herein use synonymously, generated by the waste-generating site 30. Pretreatment units 12 are connected to a final treatment facility 40 via a network of collection pipes 14, which make up a collection line 20.

Along collection line 20, located systematically in between pretreatment units 12 and final treatment facility 30, are gathering stations 50. Gathering stations 50 allow for collection and consolidate of waste streams from multiple pretreatment units 12, and may be used for subsequent pretreatment or upset detection and isolation: Gathering stations 50 include a pump chamber 16 for holding the gathered waste for a variable period of time in order to permit treatment initiated at a pretreatment unit 12 time to reduce contaminants in the waste, or to sequence the flow of the various volumes of waste from multiple pretreatment units 12 to the final treatment facility 40.

Multiple gathering stations 50 may be arranged in sequence along collection line 20, between a group of given pretreatment units 12 and the final treatment facility 40. In such arrangement, the gathering stations 50, which receive waste from other gathering stations 50 serve to regulate the flow into the final treatment facilty 40, and are specifically referred to as surge equalization stations 52.

Pretreatment stations 12 perform initial treatment of the waste stream as is comes from the waste-generating site 30. Pretreatment stations 12 partially process the waste stream to remove or reduce contaminants that may pose problems to transmitting waste stream through pipes of reduced diameter to a final treatment facility 40. Such initial treatment or partial treatment may be referred to herein as pretreatment.

A purpose of pretreatment units 12 is to remove contaminants that may cause plugging in the collection line 20. Such plugging contaminants include organic materials, suspended solids and other matter that may impede flow through the collection pipes 14. Pretreatment units 12 may include aerobic, anaerobic, chemical, electrochemical, filtration or any other method or combination of methods suitable to remove and reduce contaminants in the wastewater adjacent to the waste-generating sites 30. Contaminants pretreated in order to reduce their concentration in the waste are sufficiently reduced so that they are not able to create sufficient biomass to plug collection line 20.

Another pretreatment unit 12 objective is to reduce or eliminate bulky contaminants to facilitate transport of the wastewater to a final treatment location in a collection line 20 comprised of collection pipes 14 possessing less flow-through capacity than required by a system possessing a capacity to handle the entire quantity of waste produced by waste-generating sites 40 supported on the collection line 20.

Pretreatment at pretreatment unit 12 may also be used to initiate treatment processes that require time to reduce contaminants. Such processes that require time are known in the art, but are typically conducted at a location where the waste may be retained for the duration of the treatment process. In the present process, initial treatment of a process that requires time may be administered at a pretreatment unit 12, and then the contaminants are reduced during transmission of the waste to the final treatement facility 40.

The wastewater flows or is pumped from the waste-generating site 30 to the pretreatment unit 12 located near the site, according to conventional methods, including gravity flow. The type of wastewater and the type of treatment required determine sizing and retention in the pretreatment unit 12. Under conditions where multiple waste-generating sites 30 produce compatible waste, multiple waste-generating sites 30 may feed into a common pretreatment unit 12.

Pretreated wastewater flows from pretreatment unit 12 to a gathering station 50 through gathering line 18 of collection line 20. As depicted in FIG. 1, gathering station 50 may gather pretreated wastewater from one or more local pretreatment units 12. In the exemplary embodiment, gathering station 50 is comprised of pump chamber 16, pump 22 and check valve 24. The pretreated wastewater is accumulated in pump chamber 16 and periodically pumped by an appropriate pump 22 further along collection pipes 14 of collection line 20. A check valve 24 is provided intermediate pump 22 and collection line 20 to prevent back flow from collection line 20. Pump 22 may be sized to match the field parameters necessary to pump from the gathering station 50 into the collection line 20. Pump chambers 16 and pumps 22 sizes may differ substantially depending on the number and size of pretreatment units 12 connected thereto. The wastewater is collected in a similar fashion from each waste generation site 30.

Pretreatment near waste-generating sites 30 provides an opportunity for early detection of upsets in the treatment system, where waste coming into the system is severely contaminating treatment system 10. Upset detection monitor 70 permits receive upset test signals from pretreatment unit 12 and gathering station 50 through upset signal lines 72. Upset detection monitor 70 may initiate an alert in order to direct an operator to check the system. Alternately, or additionally, upset detection monitor 70 may initiate suspend transmission of waste through collection line 20, until the situation can be corrected. Such early detection prevents the entire system 10 from experiencing an upset.

The discharge from a given gathering station 50 can be time dosed into collection line 20. Such time dosing is accomplished with a monitoring and control system 60. The operational status of final treatment facility 40 and surge equalization stations 52 through final treatment signal 64 or equalization signal 66. The flow from a given gathering station 50 or surge equalization station may be regulated, in relationship to the entire system, by scheduling the various pump 22 cycles of the various waste-generating sites 30. Control signals may be sent through gathering signal lines 62 or equalization signal lines 66. Alternatively, or additionally, pump chambers 16 may have level sensors (not shown), which with pumps 22 may be connected to a central monitoring and control center 60. From this center 60, flow rates may be monitored and adjusted to optimize the operation of the system and the individual gathering station 50 dosing rates through gathering signal lines 62 or equalization signal lines 66. Such dosing allows averaging of reduction of peak flows into collection line 20 and facilitates minimum sizing of collection pipes 14.

The collection pipes 14 of collection line 20 required in the present invention is smaller than pipes of conventional pressure or gravity collection systems collecting from equivalent waste-generating sites 30, since the pretreated water has been treated to remove organic materials, suspended solids and other matter that may impede flow through collection pipes 14. Such reduction in size provides a like reduction in installation costs, maintenance costs and operation costs.

The pretreated wastewater is pumped through collection line 20 to the final treatment facility 40. Final treatment may include additional aerobic, anaerobic, chemical, electro-chemical treatment, filtration, disinfection or combinations of these or other methods of wastewater treatment. The purpose of the final treatment facility 40 is to process the wastewater to meet final discharge parameters for discharge to the environment or for reuse. This generally involves disinfection of the pretreated wastewater.

In order to further equalize peak flows over a longer period, surge equalization stations 52 may be inserted along collection line 20. These surge equalization stations 52 have surge equalization tanks 26, which are sized to receive peak flows and hold the peak flows for a period of hours to allow smaller collection pipes 14 to the final treatment facility 40. The water level within a surge equalization tank 26 is kept low during non-peak periods by a pump 27 and level control device (not shown).

These surge equalization stations 52, with surge equalization tanks 26, pumps 27 and check valves 28, operate similarly to other gathering stations 50, possessing pump chambers 16, pumps 22 and check valves 24, respectively, but surge equalization stations 52 receive at least part of their waste stream from a gathering station 50 positioned previously in collection line 20.

The wastewater level in surge equalization tank 26 is maintained at a low level during non-peak flow to provide a reserve volume necessary to receive surges of wastewater during peak flows. Pump 27 may be equipped with a timing device (not shown) and a level control switch (not shown). The level switch activates pump 27 when the water reaches a predetermined level. If the flow is normal the level control switch will turn pump 27 off when the water level drops to a predetermined level. If water flow exceeds the pump-out rate, the timer will turn pump 27 off, though the predetermined level may not have been reached, after a predetermined amount of water is pumped to the final treatment plant 40. If the water level remains above the level switch activation level, after a delay the level switch will reactivate the pump 27. This will continue until the water level drops below the shutoff level.

Check valve 28 may be positioned intermediate pump 27 and final treatment facility 40 to prevent back flow from collection line 20.

Figure 2:
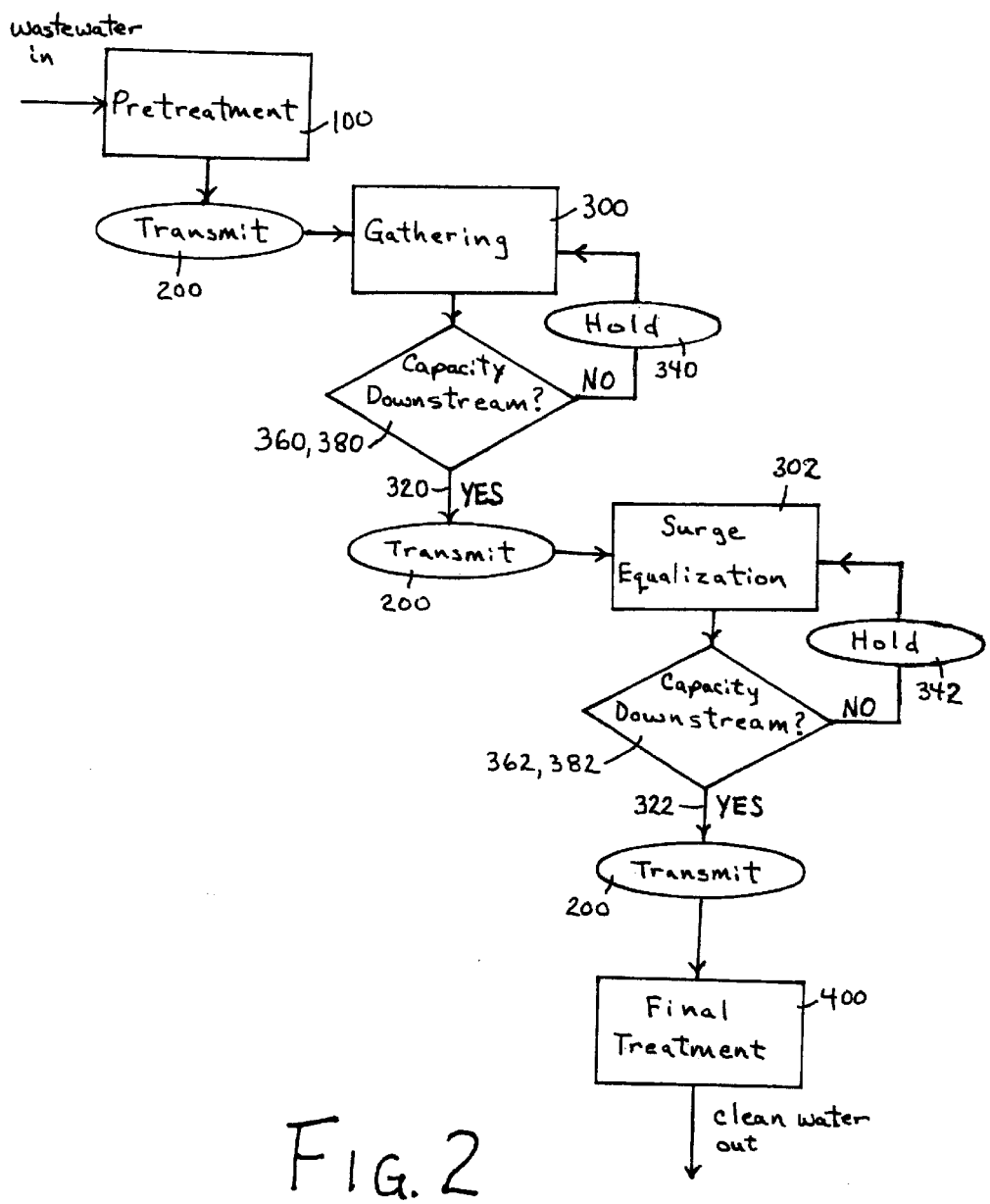
FIG. 2 provides a schematic diagram of the treatment process of the present invention.

The process of the present invention is schematically depicted at FIG. 2. Referring to FIGS. 1 and 2, the treatment process of system 10 is comprised of pretreating 100 the waste stream physically near the particular waste-generating site 30. A pretreatment unit 12 is located at each waste-generating site 30. The specific type of pretreatment conducted during pretreatment 100 depends on characteristics of the typical waste produced by the nature of waste-generating site 30. Various components of the contaminants are readily segregated once specific characteristics are determined. The intent of pretreatment 100 is to remove or treat contaminants that may impede the flow of waste through collection pipes 14. Suspended and dissolved solids are removed, and organic matter, which, when consumed by microorganisms, can cause biomass buildup, is treated.

Pretreatment 100 may include a grate or wire, and a trash tank to receive large solid material. Pretreatment 100 pretreatment may include aerobic or anaerobic treatment to remove organic and inorganic materials, which systems promote microorganism consumption of the materials and accumulation of resultant biomass product of consumption. The biomass product can then be removed prior to the pretreated waste stream entering collection line 20. The biomass buildup may impede the flow of waste through collection line 20, if not sufficiently treated in pretreatment 100. Pretreatment 100 may involve chemical or electro-chemical systems to remove any fouling material from the wastewater. Waste-generating sites 30 that produce industrial waste may especially need these, or other specialized contamination removal measures.

The components of the pretreatment units are sized to provide sufficient retention time and treatment during pretreatment, to insure organic matter and suspended solids are at a level that insures unrestricted flow in collection line 20. In the exemplary embodiment, collection line 20 is comprised of collection pipe 14 sized to transmit water.

It is important to filter the effluent wastewater to insure clean wastewater discharge. A self-cleaning filter, such as that described in U.S. Pat. No. 6,103,109, is favorable and can reach organic matter and suspended solid levels of less than 20 PPM BOD (parts per million biological oxygen demand) and 20 PPM TSS (parts per million total suspended solids), which are levels sufficient to insures unrestricted flow in collection line 20. Other devices known to the field can provide suitable methods for treatment of the wastewater to achieve functional treatment levels for pretreatment 100.

The various sub-processes involved in pretreatment 100 are presently commercially practiced. However, they are often practiced with prior art on site dispersal systems, which are not required in the present invention.

Once the wastewater is processed through pretreatment 100, it is ready to enter collection line 20, for transmission 200 to the final treatment facility 40. In the exemplary embodiment, collection line 20 possesses gathering stations 50 intermediate the pretreatment units 12 and the final treatment facility 40.

Transmitting 200 comprises transmitting the pretreated waste through collection line 20 to final treatment facility 40. The collection pipes 14 of collection line 20 are sized to meet hydraulic requirements for collecting clean water (as opposed to hydraulic requirement for collecting water containing sludge and suspended solids of prior art systems). A typical collection line may comprise polyvinylchloride pipe with diameters of 1½ inches to 4 inches (~3.8 cm to ~10.2 cm). Collection line 20 does not require deep burial to maintain gradient, since the smaller size of collection pipe 14, made possible by the reduced bulk of pretreated waste, permits economical pumping. The small diameter of collection pipe 14 and lower pressures allows installation of flexible piping.

In the exemplary embodiment, gathering 300, consisting of gathering the waste from one or more pretreatment units 12 at a gathering station 50, in order to control the rate of the flow of waste into the final treatment facility 40, selectively interrupts transmitting 200 waste stream to final treatment facility 40. As the wastewater level reaches a sufficient volume in pump chamber 16, pump 22 is activated to pressure insert the wastewater into the collecting pipes 14 of collection line 20. Grinding of the waste is not required as in prior art pump stations. The criteria for selecting the pump 22 are the hydraulic characteristics of the collection line 20 at the point of insertion.

The wastewater in the gathering station 50 feeds 320 gathered waste, by pump 22, into the segment of collection line 20 that leads toward the final treatment facility 40. Check valves 24 prevent back flow from the collection line 20.

The pump chamber 16 is sized large enough to act as a buffer for surges during peak flows. At such times, gathered waste may be held 340 in pump chamber 16, so as to not overload the segment of the collection line 20 downstream. Sensing 360 may be preformed to check the quantity of waste at selected locations downstream from a particular pump chamber 16. Feedback 380 information is received to determine the quantity of waste to be fed at a particular time. In the exemplary system 10, the sensing and feedback functions are performed by monitoring and control system 60.

Subsequent gathering or surge equalization 302 may also be performed in order to more thoroughly regulate surges of waste that may occur from the multiple waste-generating sites 30. Except for receiving waste from a prior gathering step 300, surge equalization 302 is similar, possessing feeding 322, holding 342, sensing 362 and feedback 382 subprocesses as discussed for gathering step 300. As such, feeding step 320 and feeding step 322 both lead to transmitting 200 waste on toward final treatment 400.

Finally treating 400 comprises the final treatment of the waste stream. Since the wastewater received by the final treatment facility 40 has been substantially treated on site, disinfection is the primary function of final treatment 400 in final treatment facility 40. Disinfection can include chlorination/dechlorination, ozone injection, UV radiation, electrocoagulation, electrological, thermal, or combinations thereof, but is not limited to these processes. The final treatment process will generally include a tank 42 for receiving and retaining the pretreated wastewater. A circulation pump (not shown) within tank 42 will insure complete mixing of pretreated wastewater. Since pretreatment of the wastewater has been accomplished at the pretreatment unit 12, and retention time has occurred during transmission along collection line 20, extended retention time, required in prior art systems, is not necessary. The tank 42 is sized to have sufficient retention time for disinfection only. Accordingly, tank 42 is smaller than prior art retention tanks handling equivalent amounts of wastewater flow-through to be treated. A filtration unit 44, such as a backflushing sand filter, may be used intermediate collection line 20 and tank 42 to remove any remaining or acquired suspended solids.

An electrocoagulation process may be used as the disinfection phase. An appropriate process utilizes a copper cell to place copper ions into the wastewater as a biocide, with an iron/aluminum combination to remove residual copper. Disinfection by electron over-balance or oxidation through electrolysis may also be utilized. Such disinfection is utilizes a titanium or stainless steel cell in the electrocoagulation process.

After final treatment 400, the wastewater, now at acceptable levels of contaminants, may be reclaimed as useable water for a variety of purposes, similarly to fresh water. The intent is to recycle the treated wastewater, but this treatment system 10 is not limited to reuse applications.

It may be seen that the treatment system 10 and process includes the capabilities of prior art municipal treatment processes, including a gathering system, a biological process, a separation process and a disinfection process. The system 10 and process of the present invention provides significant advantage by providing a pretreatment process at the waste-generating site 30.

The effluent of the present process may be controlled to exceed regulatory, environmental and sound practice requirements. Unlike prior art individual systems, the treated effluent may be carefully monitored at a single discharge location to assure effluent quality.

It will be noted that the foregoing illustrative system depicts an exemplary collection system. It will be understood that the present invention can be practiced with a plurality of collection lines, including inter-connecting lines, branch lines and the like without departing from the scope of the invention. It will be further understood that various deviations from the literal description set forth herein may be practiced within the scope of the invention.

What is claimed is:

1. A system for treatment of waste from a plurality of waste-generating sites, said waste containing water and contaminants, said contaminants including flow-impediment contaminants, said system comprising:

a plurality of pretreatment units, a collection line, a plurality of gathering stations and a final treatment facility;

each of said plurality of pretreatment units capable of receiving waste from at least one of said waste-generating sites;

each said pretreatment unit comprising pretreatment means for removing said flow-impediment contaminants from said waste;

said collection line providing fluid communication of said pretreated waste from each said pretreatment unit to one of said plurality of gathering stations;

each of said plurality of gathering stations located remote from each of said plurality of pretreatment units;

said collection line further providing fluid communication of said waste from said plurality of gathering stations to said final treatment facility;

said plurality of gathering stations each comprising a pump chamber and a pump;

said collection line comprising a plurality of line segments;

each said pump chamber operationally connected to at least one of said plurality of line segments to receive said waste;

each said pump operationally connected to one said pump chamber and at least one said plurality of line segments to transmit said waste toward said final treatment facility;

said final treatment facility remote from each of said plurality of gathering stations;

said final treatment facility comprising final treatment means for treating remaining contaminants contained in said waste;

each said pump selectively operable to communicate said waste from one of said plurality of gathering stations through one of said plurality of line segments;

a sensing system and a feedback system operationally connected to selected measurement locations of said system;

said sensing system capable of identifying data concerning the waste at a selected measurement location;

said feedback system capable of processing said data to determine a quantity of waste to be pumped from a gathering station; and said sensing system and said feedback system operable to selectively retain waste at selected gathering stations and to selectively pump waste from other selected gathering stations.

2. A system as in claim 1, further comprising:

said sensing system operable to determine upset test signals at said measurement locations; and said feedback system operable to extend retention times at selected gathering stations in response to said upset test signals.

3. A system as in claim 1, further comprising:

said system further comprising a plurality of surge equalization stations;

said plurality of surge equalization stations comprising holding capacity;

said sensing system operable to retain waste at selected surge equalization stations and gathering stations; and said feedback system operable to selectively dose said pretreated waste from selected surge equalization stations and selected gathering stations into at least one of said plurality of line segments.

4. A system for treatment of waste from a plurality of waste-generating sites, said waste containing water and contaminants, said system comprising:

a plurality of pretreatment units, a collection line, a plurality of gathering stations and a final treatment facility;

each said pretreatment unit capable of receiving waste from at least one of said waste-generating sites;

each said pretreatment unit comprising pretreatment means for removing contaminants of determined characteristics from said waste;

said collection line providing fluid communication of said waste from each said pretreatment unit to said plurality of gathering stations;

said plurality of gathering stations each separately located and remote from said plurality of pretreatment units;

said collection line further providing fluid communication of said waste from each of said plurality of gathering stations to said final treatment facility;

said final treatment facility remote from said plurality of gathering stations;

said final treatment facility comprising final treatment means for treating remaining contaminants contained in said waste;

a sensing system and feedback system operationally connected to selected measurement locations of said system;

said sensing system capable of identifying data concerning the waste at a selected measurement location;

said feedback system capable of processing said data to determine a quantity of waste to be pumped from a gathering station;

said sensing system and said feedback system operable to selectively retain waste at selected gathering stations and to selectively pump waste from other selected gathering stations;

said sensing system operable to determine upset test signals at said measurement locations; and said control system operable to extend retention times at selected gathering stations in response to said upset test signals.

5. A system as in claim 4, wherein said pretreatment unit further comprising:

pretreatment means for removing contaminants of a determined size characteristic from said waste; and pretreatment means for removing non-flow-impeding contaminants from said waste.

6. A system as in claim 4, further comprising:

each said pretreatment unit comprising aerobic pretreatment means.

7. A system as in claim 4, further comprising:

each said pretreatment unit comprising anaerobic pretreatment means.

8. A system as in claim 4, further comprising:

each said pretreatment unit comprising pretreatment means for injecting chemical compounds for treatment of said contaminants contained in said waste.

9. A system as in claim 4, further comprising:

said system further comprising a plurality of surge equalization stations;

said plurality of surge equalization stations comprising holding capacity;

said sensing system operable to retain waste at selected surge equalization stations and gathering stations;

said feedback system operable to selectively dose said pretreated waste from selected said plurality of surge equalization stations and selected said plurality of gathering stations into at least one of said plurality of line segments.

* * * * *